O. B. ANDREWS.
TRAP NEST.
APPLICATION FILED MAY 6, 1916.

1,192,726.

Patented July 25, 1916.
2 SHEETS—SHEET 1.

Inventor
Oliver B. Andrews,
By T. C. Witherspoon
Attorney

O. B. ANDREWS.
TRAP NEST.
APPLICATION FILED MAY 6, 1916.

1,192,726.

Patented July 25, 1916.
2 SHEETS—SHEET 2.

Inventor
Oliver B. Andrews,
By T. G. Witherspoon
Attorney

UNITED STATES PATENT OFFICE.

OLIVER B. ANDREWS, OF CHATTANOOGA, TENNESSEE.

TRAP-NEST.

1,192,726.   Specification of Letters Patent.   Patented July 25, 1916.

Application filed May 6, 1916. Serial No. 95,934.

*To all whom it may concern:*

Be it known that I, OLIVER B. ANDREWS, a citizen of the United States, residing at Chattanooga, in the county of Hamilton and State of Tennessee, have invented certain new and useful Improvements in Trap-Nests; and I do hereby declare the following to be a full, clear, and exact description of the invention, such as will enable others skilled in the art to which it appertains to make and use the same.

This invention relates to trap nests and has for its object to provide a device of this character which will be simple in construction, comparatively inexpensive to manufacture, and more efficient in operation than those heretofore proposed.

With these and other objects in view the invention consists in the novel details of construction, and combinations of parts more fully hereinafter disclosed and particularly pointed out in the claims.

Figure 1:
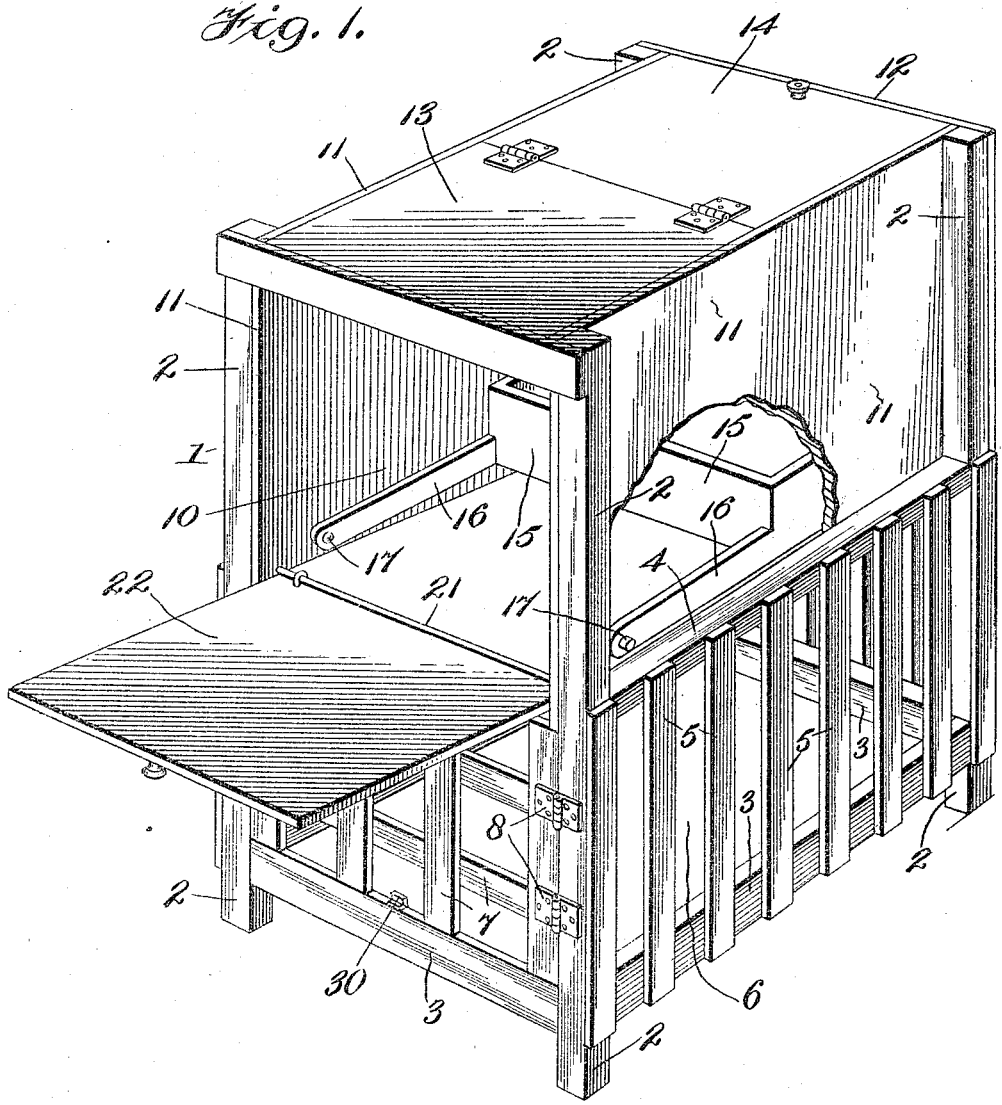
Figure 2:
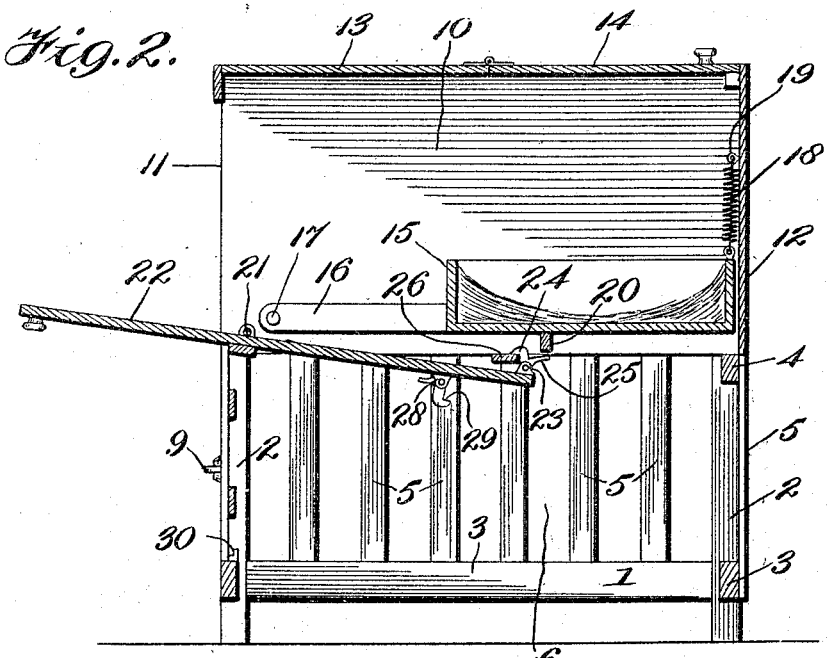
Figure 3:
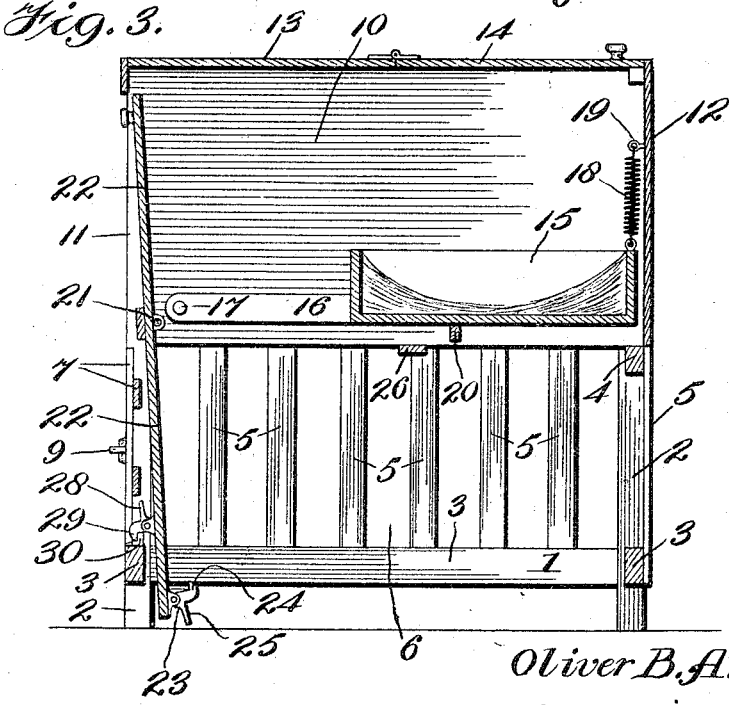

Referring to the accompanying drawings forming a part of this specification in which like numerals designate like parts in all the views:—Figure 1 is a perspective view of a trap nest made in accordance with my invention, the parts being shown in their open or set positions; Fig. 2 is a central longitudinal sectional view of the parts shown in Fig. 1; and Fig. 3 is a view similar to Fig. 2, but illustrating the positions of the parts after the trap has been sprung.

1 designates any suitable framework, comprising the corner posts 2, the lower horizontal stringers 3, and the upper horizontal stringers 4. The stringers 3 are preferably secured a short distance above the lower ends of the corner posts 2, while the stringers 4 are preferably fastened about midway of the said corner posts, as shown. The strips or bars 5 are suitably secured to the stringers 3 and 4 upon three sides of the framework, thus forming a crate-like inclosure or compartment 6, as will be clear from the drawings. The fourth side of this inclosure is provided with a gate or door 7, preferably of lattice-work or other open construction, hinged as at 8 to one of the said corner posts 2, and provided with a suitable catch 9 for preventing its being accidentally or unintentionally opened.

Above the inclosure 6 I provide a compartment 10 formed by the side walls 11 and end 12 and top 13, the said walls 11 and end 12 extending from the stringers 4 up to the top of the corner posts 2 as shown. The top 13 is provided with a hinged door 14 adapted to afford access from above to the interior of the trap nest, as will be readily understood.

Within the compartment 10 I provide the box or nest 15, having a pair of horizontal arms 16 extending from one end and pivoted to the side walls 11 as at 17. To the opposite end of the said nest 15 is secured one end of a spiral spring 18, the other end of which is fastened as by the eye 19 to the end wall 12, see Figs. 2 and 3. Beneath the nest 15 and fastened thereto is a cleat or strip 20, the purpose of which will be more fully hereinafter disclosed.

Pivoted to the rod 21, supported by the framework 1, is the vertically swinging member 22 having near one of its ends the spring catch 23, having a toe 24 and a finger 25. The toe 24 is adapted to engage a strip or cleat 26 extending from side to side of the framework 1 and secured thereto, and to thereby hold the member 22 in a horizontal position, as shown in Figs. 1 and 2.

It will be noted from Figs. 2 and 3 that the member 22 is so positioned with respect to the pivot rod 21 that the portion lying to the right of the said rod, as seen in Fig. 2, is greater than that lying to the left of said rod. It results from such construction that the said right hand portion, being the heavier, will always tend to swing the said member 22 around the pivot 21 so as to maintain it in a substantially vertical position, as seen in Fig. 3. To keep it in this position a spring catch 28 having a toe 29 is provided on said member 22, the said toe 29 being adapted to engage the keeper 30 mounted upon the end stringer 3, as will be clear from the drawings.

The trap nest is made ready for occupancy by manually releasing the toe 29 of the catch 28 from engagement with the keeper 30 and then swinging the member 22 about its pivot rod 21 until the toe 24 of the spring catch 23 snaps over and engages the cleat 26, the parts now being in the positions shown in Figs. 1 and 2. When the parts are in such positions it is evident that entrance to the upper compartment 10 and nest 15 is permitted, but not to the lower compartment 6. However, when the fowl or other animal enters the nest 15 by way of the member 22, the weight of the said fowl will cause the said nest to swing downwardly about the pivots 17 and against the tension of the spring 18, until the cleat 20 contacts with the finger 25 of the spring catch 23. Such engagement of the finger 25 will move the toe 24 out of engagement with the cleat 26, whereupon the member 22 will swing around its pivot 21 until the toe 29 of the catch 28 engages the keeper 30, and locks it in the position illustrated in Fig. 3. When in this position it is evident that the fowl may leave the nest 15 at will and descend into the lower compartment 6, from whence it may be released by an attendant by opening the gate or door 7 and then swinging up the member 22, when the nest will be ready for the next occupant.

It will thus be seen that I have provided a trap nest which is simple and comparatively inexpensive to manufacture and one from which the fowl cannot escape after once entering until released by the attendant. This is especially desirable in fancy poultry breeding where it is wished to keep a record of the eggs laid by each hen, since but one fowl may occupy it at a time. The trap nest may also be used to advantage in the case of a setting hen, she being confined to the nest and protected from outside disturbing influences, but at the same time left free to descend into the lower compartment 6 to obtain food, drink and exercise. It will also be noted that owing to the construction of the member 22 it is impossible for the fowl to escape from the lower compartment even if the gate 7 be left unfastened or partly open and for the reason that the downwardly swinging end of the said member 22 effectually closes the opening adapted to be normally closed by the said gate 7.

What I claim is:—

1. In a trap nest the combination of a framework; a trap door pivoted above its center of gravity to said framework, adapted to occupy substantially horizontal and vertical positions, and when in its horizontal position adapted to partially divide said trap nest into an upper and lower compartment; a nest proper pivotally supported near the bottom of said upper compartment; a catch on the inside lower end of said door adapted to hold said door in its open or horizontal position; means on said nest adapted to contact with said catch to release said door and permit it to automatically assume its vertical position; and a catch on the outside lower portion of said door adapted to hold said door in its vertical position, substantially as described.

2. In a trap nest the combination of a framework; a trap door pivoted to said frame work said door being adapted to occupy a substantially horizontal or open position whereupon it partially divides said trap nest into an upper and a lower compartment and said door also adapted to occupy a substantially closed or vertical position whereupon it closes said compartments; a hen nest pivotally located in said upper compartment; sheet material surrounding said hen nest on three sides of said upper compartment; open, strip material surrounding said lower compartment on three sides thereof; a catch on said door adapted to hold it in its horizontal or open position; means associated with said hen nest for releasing said catch and permitting said door to close; and means on said door for holding it in its closed position, substantially as described.

3. In a trap nest the combination of a framework; a trap door of sheet material pivoted to said framework, said door being adapted to occupy a substantially horizontal or open position whereupon it partially divides said trap nest into an upper and a lower compartment, and said door also being adapted to occupy a substantially closed or vertical position whereupon it closes said compartments; a hen nest pivotally located in said upper compartment; a spring for normally holding said hen nest in its raised position; sheet material surrounding said hen nest on three sides of said upper compartment; open strip material surrounding said lower compartment on three sides thereof; a gate for opening and closing said lower compartment; a catch on said door adapted to hold it in its horizontal or open position; means associated with said hen nest for releasing said door and permitting it to close; and means on said door for holding it in its closed position inside said gate, substantially as described.

In testimony whereof I affix my signature, in presence of two witnesses.

OLIVER B. ANDREWS.

Witnesses:
A. O'Connell,
M. M. Clark.

Copies of this patent may be obtained for five cents each, by addressing the "Commissioner of Patents, Washington, D. C."